(12) United States Patent
Seidel

(10) Patent No.: US 11,352,494 B2
(45) Date of Patent: *Jun. 7, 2022

(54) ANTI-STATIC THERMOPLASTIC MOLDING MATERIALS

(71) Applicant: Covestro Deutschland AG, Leverkusen (DE)

(72) Inventor: Andreas Seidel, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 312 days.

This patent is subject to a terminal disclaimer.

(21) Appl. No.: 16/096,965

(22) PCT Filed: Apr. 25, 2017

(86) PCT No.: PCT/EP2017/059706
§ 371 (c)(1),
(2) Date: Oct. 26, 2018

(87) PCT Pub. No.: WO2017/186663
PCT Pub. Date: Nov. 2, 2017

(65) Prior Publication Data
US 2020/0325330 A1    Oct. 15, 2020

(30) Foreign Application Priority Data

Apr. 27, 2016    (EP) ..................................... 16167315

(51) Int. Cl.
*C08L 69/00*    (2006.01)
*C08K 3/22*     (2006.01)

(52) U.S. Cl.
CPC ............. *C08L 69/005* (2013.01); *C08L 69/00* (2013.01); *C08K 2003/2241* (2013.01); *C08L 2205/035* (2013.01)

(58) Field of Classification Search
CPC ........ C08L 69/00; C08L 69/005; C08L 67/03; C08K 2003/2241
See application file for complete search history.

(56) References Cited

U.S. PATENT DOCUMENTS

| | | |
|---|---|---|
| 3,419,634 A | 12/1968 | Vaughn, Jr. |
| 3,553,167 A | 1/1971 | Schnell et al. |
| 3,644,574 A | 2/1972 | Jackson, Jr. et al. |
| 3,692,744 A | 9/1972 | Rich et al. |
| 3,875,123 A * | 4/1975 | Margotte ................. C08F 20/16 526/319 |
| 4,013,613 A | 3/1977 | Abolins et al. |
| 4,075,173 A | 2/1978 | Maruyama et al. |
| 4,156,069 A | 5/1979 | Prevorsek et al. |
| 4,176,224 A | 11/1979 | Bier et al. |
| 4,269,964 A | 5/1981 | Freitag et al. |
| 4,311,823 A | 1/1982 | Imai et al. |
| 4,334,053 A | 6/1982 | Freitag et al. |
| 4,584,360 A | 4/1986 | Paul et al. |
| 4,731,405 A | 3/1988 | Kirsch et al. |
| 4,871,804 A | 10/1989 | Murabayashi |
| 4,937,285 A | 6/1990 | Wittmann et al. |
| 6,706,851 B1 | 3/2004 | Linemann et al. |
| 6,784,257 B2 | 8/2004 | Hilgers et al. |
| 6,913,804 B2 | 7/2005 | Lacroix et al. |
| 6,956,073 B2 * | 10/2005 | Takagi ................. C08K 5/523 524/127 |
| 8,455,581 B2 | 6/2013 | Feldermann et al. |
| 8,883,878 B2 * | 11/2014 | Volkers .................... C08K 9/06 523/200 |
| 10,655,011 B2 * | 5/2020 | Seidel ..................... C08L 55/02 |
| 2018/0346714 A1 | 12/2018 | Bushelman et al. |

FOREIGN PATENT DOCUMENTS

| | | |
|---|---|---|
| CA | 1173998 A | 9/1984 |
| CN | 101469117 A | 7/2009 |
| CN | 101759974 A | 6/2010 |
| CN | 101967274 A | 2/2011 |
| CN | 104830043 A | 8/2015 |
| DE | 1900270 A1 | 11/1969 |
| DE | 2035390 A1 | 1/1971 |
| DE | 1495626 B1 | 6/1971 |

(Continued)

OTHER PUBLICATIONS

International Search Report for PCT/EP2017/059706 dated Jun. 21, 2017.

(Continued)

*Primary Examiner* — Vickey Nerangis

(74) *Attorney, Agent, or Firm* — Faegre Drinker Biddle & Reath LLP

(57) ABSTRACT

The present invention relates to compositions comprising A) 50 to 90% by weight of at least one representative selected from the group consisting of aromatic polycarbonate, aromatic polyestercarbonate and aromatic polyester, B) 5 to 40% by weight of rubber-based graft polymer or a mixture of rubber-based graft polymer and rubber-free vinyl (co) polymer, C) 3 to 25% by weight of at least one polyether-based polymer or copolymer selected from the group consisting of polyether block polymers and polyether-based polyurethanes, D) 0.8 to 9% by weight of at least one pigment based on titanium dioxide, E) 0 to 20% by weight of one or more further additives, to the use of the compositions for producing moulded articles and to the moulded articles themselves.

11 Claims, No Drawings

(56) References Cited

FOREIGN PATENT DOCUMENTS

| | | |
|---|---|---|
| DE | 2248242 A1 | 4/1973 |
| DE | 2232877 A1 | 1/1974 |
| DE | 2407674 A1 | 10/1974 |
| DE | 2407776 A1 | 9/1975 |
| DE | 2703376 A1 | 8/1977 |
| DE | 2714544 A1 | 10/1977 |
| DE | 2715932 A1 | 10/1978 |
| DE | 2842005 A1 | 4/1980 |
| DE | 3000610 A1 | 7/1980 |
| DE | 2940024 A1 | 4/1981 |
| DE | 3007934 A1 | 9/1981 |
| DE | 3334782 A1 | 10/1984 |
| DE | 3544295 A1 | 6/1987 |
| DE | 3832396 A1 | 2/1990 |
| EP | 613919 A1 | 9/1994 |
| EP | 730005 A2 | 9/1996 |
| EP | 1046675 A1 | 10/2000 |
| EP | 1155065 A1 | 11/2001 |
| EP | 1262527 A2 | 12/2002 |
| GB | 1464449 A | 2/1977 |
| JP | H09137053 B2 | 5/1997 |
| JP | H10101921 B2 | 4/1998 |
| JP | 2004-231801 A | 8/2004 |
| JP | 2014-530263 A | 11/2014 |
| JP | 2018-528306 A | 9/2018 |
| WO | WO-0129113 A1 | 4/2001 |
| WO | WO-2012084848 A1 | 6/2012 |
| WO | WO-2013001168 A1 | 1/2013 |
| WO | 2017/042355 A1 | 3/2017 |

OTHER PUBLICATIONS

International Search Report for PCT/EP2017/059745 dated Jun. 21, 2017.
Written Opinion of the International Searching Authority for PCT/EP2017/059706 dated Jun. 21, 2017.
Written Opinion of the International Searching Authority for PCT/EP2017/059745 dated Jun. 21, 2017.

* cited by examiner

ANTI-STATIC THERMOPLASTIC MOLDING MATERIALS

CROSS-REFERENCE TO RELATED APPLICATIONS

This application is a national stage application (under 35 U.S.C. § 371) of PCT/EP2017/059706, filed Apr. 25, 2017, which claims benefit of European Application No. 16167315.7, filed Apr. 27, 2016, both of which are incorporated herein by reference in their entirety.

The present invention relates to permanently antistatically endowed thermoplastic moulding materials and compositions thereof comprising at least one polymer selected from the group consisting of aromatic polycarbonate, aromatic polyestercarbonate and aromatic polyester, to the use of the moulding materials for producing moulded articles and to the moulded articles themselves.

The invention further provides for the use of pigments based on titanium dioxide for improving toughness and electrical surface conductivity of compositions endowed with polyether-based polymers and comprising at least one polymer selected from the group consisting of aromatic polycarbonate, aromatic polyestercarbonate and aromatic polyester.

BACKGROUND OF THE INVENTION

The accumulation of dust with the formation of dust figures caused by electrostatic charging is a widespread problem in moulded plastics articles. Dust deposits on high-gloss moulded articles are particularly troublesome and functionally limiting.

The abovementioned problems are often solved by application of an antistatic coating (for example by painting). Examples of relevant fields of application include housings applications in information technology and decorative automotive interior components. Especially in the latter field of application a high material ductility even at low temperatures is generally a further component requirement.

If a downstream coating process is to be eschewed the moulding materials must naturally not only possess the desired mechanical properties but must moreover also inherently possess the required surface properties (high electrical dissipative conductivity/low specific electrical surface resistance). However, the required combination of ductility even at low temperatures and high electrical dissipative conductivity is often not sufficiently realized by thermoplastic compositions of the prior art.

Polycarbonate combinations are often employed in the recited fields of application because of their advantageous combination of properties including good processability (high melt flowability), exceptional mechanical properties, high heat distortion resistance and flame retardancy. Additionally, while permanently antistatically endowed polycarbonate compositions are known in principle, the addition of the additives required therefor generally, has a deleterious effect on the properties sought.

The provision of polycarbonate compositions which are not only sufficiently permanently antistatic but also possess low-temperature toughness is thus also an insufficiently solved technical problem.

The literature describes antistats for thermoplastics (see for example Gächter, Müller, Plastic Additives, Hanser Verlag, Munich 1996, p. 749 et seq.) which reduce dust accumulation. These antistats reduce the electric surface resistance of the plastics moulding materials, thus better discharging surface charges which form during production and through friction during use. Dust particles are thus electrostatically attracted to a lesser extent.

Polyetheramides, polyesteramides or polyetheresteramides are commonly described antistats and these compounds are capable of endowing polyester compositions with a permanent antistatic activity. Their activity is based on the formation of a three-dimensional network of the antistat in the antistat-immiscible polymer to be antistatically endowed. On account of the comparatively high electrical conductivity of polyetheramides, polyesteramides and polyetheresteramides this results in an instant and permanent reduction in the electrical surface and volume resistance of the polymer to be antistatically endowed, onset of which occurs even at very low atmospheric humidities and is far less dependent thereupon than is the case for the surface-active compounds such as salts of long-chain sulphonic acids likewise recited in the literature.

Permanently antistatically endowed polycarbonate compositions are disclosed for example in U.S. Pat. No. 6,784,257 B2. This application describes antistatic polymer compositions comprising a thermoplastic polymer and a polyether-polyamide block copolymer having a melting point between 80° C. and 150° C., wherein the polyether blocks comprise ethylene oxide units.

U.S. Pat. No. 6,706,851 B1 discloses antistatic polymer compositions comprising a thermoplastic polymer and a polyetheresteramide block copolymer, wherein the polyether blocks consist essentially of ethylene oxide units.

U.S. Pat. No. 6,913,804 B2 discloses antistatic polymer compositions comprising a thermoplastic polymer and a mixture of a copolymer which comprises polyamide and polyether blocks and does not comprise any ionically-functional groups and a copolymer comprising polyamide and polyether blocks which does comprise conically-functional groups.

All three of the abovementioned patents also disclose compositions in which the thermoplastic polymer is polycarbonate, ABS or a mixture thereof.

CN 101967274 A discloses permanently antistatic polycarbonate/acrylonitrile-butadiene-styrene (PC/ABS) compositions having excellent mechanical properties and weathering resistance comprising polycarbonate, an ABS resin, antistatic agents, compatibilizers, antioxidants, light stabilizers and other additives. Antistatic agents disclosed include polyetheresters, polyetheresteramides and polyetheramides.

CN 101759974 A discloses antistatic polycarbonate compositions having low odour and high toughness for automotive interior applications comprising polycarbonate, ABS resin produced in a bulk polymerization process and having a melt flow index of 4 to 25 g/10 min, a polymeric antistatic agent, a compatibilizer and optionally further additives selected from for example the group comprising colourants, fillers, stabilizers and lubricants. Antistatic agents disclosed include polyetheramides.

JP 3663701 B2 discloses antistatic polycarbonate compositions comprising polycarbonate, rubber-modified thermoplastic comprising vinyl polymer and graft polymer obtained by grafting vinyl monomers onto rubber-like polymers and polyetheramides.

DE 3544295 A1 discloses moulding materials comprising halogenated copolycarbonates, graft polymers based on an acrylate rubber, thermoplastic copolymers, tetrafluoroethylene polymers, metal compounds of antimony or bismuth, titanium dioxide and optionally low molecular weight, organic halogen compounds, stabilizers, flow agents, antistats and/or demoulding agents. The moulding materials feature a combination of good flame retardancy, tracking resistance, thermal resilience and processability.

WO 2012/084848 A1 discloses antistatic polycarbonate moulding materials having improved heat distortion resistance, low-temperature toughness, processing stability, stress fracture resistance and hydrolysis resistance comprising polycarbonate, rubber-modified vinyl (co)polymer, a compound selected from the group consisting of polyetheramides, polyesteramides and polyetheresteramides, a special Brønsted acid and optionally further additives.

It was desirable to provide permanently antistatic compositions comprising at least one polymer selected from the group consisting of aromatic polycarbonate, aromatic polyestercarbonate and aromatic polyester having an improved combination of lowest possible specific electrical surface resistance (sufficiently high electrical dissipative conductivity) and low-temperature ductility. The compositions should moreover exhibit high heat distortion resistance. The compositions should accordingly fulfill the requirements of the automotive industry for unpainted decorative components in automotive interiors. Such a composition as is disclosed in the present invention has not hitherto been described in the prior art.

BRIEF SUMMARY OF THE INVENTION

It has now been found that compositions comprising
A) 50 to 90% by weight, preferably 60 to 80% by weight, particularly preferably from 65 to 75% by weight, of at least one polymer selected from the group consisting of aromatic polycarbonate, aromatic polyestercarbonate and aromatic polyester, preferably aromatic polycarbonate,
B) 5 to 40% by weight, preferably 10 to 30% by weight, particularly preferably 15 to 25% by weight, of rubber-based graft polymer or a mixture of rubber-based graft polymer and rubber-free vinyl (co)polymer,
C) 3 to 25% by weight, preferably 5 to 15% by weight, particularly preferably 6 to 12% by weight, of at least one polyether-based polymer or copolymer selected from the group consisting of polyether block polymers and polyether-based polyurethanes,
D) 0.8 to 9% by weight, preferably 2 to 8% by weight, particularly preferably 3 to 7% by weight, of at least one pigment based on titanium dioxide,
E) 0 to 20% by weight, preferably 0.1 to 15% by weight, more preferably 0.2 to 10% by weight, of one or more further additives,
have the advantageous properties.

In a preferred embodiment components C and D are employed in a ratio of C/D, in % by weight in each case, of 0.7 to 15, preferably of 1 to 6, particularly preferably of 1.1 to 4, most preferably of 1.2 to 2.5.

A further embodiment of the present invention is the use of pigments based on titanium dioxide for improving toughness and surface conductivity of compositions endowed with polyether block polymers and comprising at least one polymer selected from the group consisting of aromatic polycarbonate, aromatic polyestercarbonate and aromatic polyester.

Particular embodiments 1 to 31 of the present invention are listed hereinbelow.
1. Compositions comprising
A) 50 to 90% by weight of at least one representative selected from the group consisting of aromatic polycarbonate, aromatic polyestercarbonate and aromatic polyester,
B) 5 to 40% by weight of rubber-based graft polymer or a mixture of rubber-based graft polymer and rubber-free vinyl (co)polymer,
C) 3 to 25% by weight of at least one polyether-based polymer or copolymer selected from the group consisting of polyether block polymers and polyether-based polyurethanes,
D) 0.8 to 9% by weight of at least one pigment based on titanium dioxide,
E) 0 to 20% by weight of one or more further additives.
2. Compositions according to embodiment 1, wherein component A comprises aromatic polycarbonate.
3. Compositions according to embodiment 1, wherein component A is aromatic polycarbonate.
4. Compositions according to any of the preceding embodiments, wherein the graft polymers employed in component B comprise
B.1 5 to 95% by weight, based on the graft polymer, of at least one vinyl monomer on
B.2 95 to 5% by weight, based on the graft polymer, of one or more rubber-elastic graft substrates having glass transition temperatures <−50° C.
5. Compositions according to embodiment 4, wherein the graft substrate B.2 is pure polybutadiene rubber.
6. Compositions according to embodiment 4, wherein the graft substrate B.2 is styrene-butadiene block copolymer rubber.
7. Compositions according to any of the preceding embodiments, wherein component B comprises vinyl (co) polymer not chemically bonded to the rubber substrate and not included in the rubber particles which consists of the monomers according to B.1 in a proportion of at least 5% by weight based on component B.
8. Compositions according to any of the preceding embodiments, wherein component B comprises vinyl (co) polymer not chemically bonded to the rubber substrate and not included in the rubber particles which consists of the monomers according to B.1 in a proportion of at least 50% by weight based on component B.
9. Compositions according to any of the preceding embodiments, wherein components C and D are employed in a weight ratio C/D of 1.1 to 4.
10. Compositions according to any of the preceding embodiments, wherein components C and D are employed in a weight ratio C/D of 1.2 to 2.5.
11. Compositions according to any of the preceding embodiments, wherein component C is a block copolymer comprising polyethylene glycol and polyamide blocks.
12. Compositions according to any of the preceding embodiments, wherein component C is a block copolymer composed of polyethylene glycol and polyamide 12 blocks.
13. Compositions according to any of the preceding embodiments, wherein component C has a specific electrical surface resistance of $\leq 10^{13} \Omega$.
14. Compositions according to any of the preceding embodiments, wherein component C has a specific electrical surface resistance of $\leq 10^{11} \Omega$.
15. Compositions according to any of the preceding embodiments, wherein component D consists to an extent of at least 95% by weight of titanium dioxide in the rutile modification.
16. Compositions according to any of the preceding embodiments, wherein component D is employed in a proportion of 0.8 to 8% by weight.
17. Compositions according to any of the preceding embodiments, wherein component D is employed in a proportion of 2 to 8% by weight.

18. Compositions according to any of the preceding embodiments, wherein component D is employed in a proportion of 3 to 7% by weight.

19. Compositions according to any of embodiments 1 to 16, wherein component D is employed in a proportion of 0.8 to 7% by weight.

20. Compositions according to any of embodiments 1 to 16, wherein component D is employed in a proportion of 0.8 to 5% by weight.

21. Compositions according to any of embodiments 1 to 16, wherein component D is employed in a proportion of 0.8 to 3% by weight.

22. Compositions according to any of embodiments 1 to 16, wherein component D is employed in a proportion of 1.5 to 5% by weight.

23. Compositions according to any of embodiments 1 to 16, wherein component D is employed in a proportion of 1.5 to 3% by weight.

24. Composition according to any of the preceding embodiments, comprising as component E at least one additive selected from the group consisting of lubricants and demoulding agents, stabilizers, flow promoters, compatibilizers and dyes and pigments distinct from component D.

25. Compositions according to any of the preceding embodiments, wherein as component E a salt which increases the conductivity of the component is further employed.

26. Compositions according to any of the preceding embodiments, wherein as component E potassium bis(oxalato) borate or sodium bis(oxalato) borate is further employed.

27. Compositions according to any of the preceding embodiments consisting of components A) to E).

28. Use of compositions according to any of embodiments 1 to 27 for producing moulded articles.

29. moulded articles produced from compositions according to any of embodiments 1 to 27.

30. Use of pigments based on titanium dioxide for improving toughness and electrical surface conductivity of compositions endowed with polyether-based polymers and comprising at least one polymer selected from the group consisting of aromatic polycarbonate, aromatic polyestercarbonate and aromatic polyester.

31. Use according to embodiment 30, wherein compositions according to any of embodiments 1 to 27 are employed.

DETAILED DESCRIPTION OF THE INVENTION

Component A

Employable components A include an aromatic polycarbonate, an aromatic polyestercarbonate, an aromatic polyester or a mixture of a plurality of representatives of one or more of these substance classes according to the description hereinabove.

Component A preferably comprises aromatic polycarbonate.

It is particularly preferable when one or more aromatic polycarbonates are employed as component A.

Aromatic polycarbonates anchor aromatic polyester carbonates according to component A which are suitable according to the invention are known from the literature or can be produced by processes known from the literature (for production of aromatic polycarbonates see by way of example Schnell, "Chemistry and Physics of Polycarbonates", Interscience Publishers, 1964 and also DE-AS (German Published Specification) 1 495 626, DE-A 2 232 877, DE-A 2 703 376, DE-A 2 714 544, DE-A 3 000 610, DE-A 3 832 396; for production of aromatic polyester carbonates see by way of example DE-A 3 077 934).

Aromatic polycarbonates are produced by way of example by reaction of diphenols with carbonyl halides, preferably phosgene and/or with aromatic diacyl dihalides, preferably dihalides of benzenedicarboxylic acids, by the interfacial process, optionally using chain terminators, for example monophenols, and optionally using trifunctional or more than trifunctional branching agents, for example triphenols or tetraphenols. Production via a melt polymerization process by reaction of diphenols with, for example, diphenyl carbonate is likewise possible.

Diphenols for the production of the aromatic polycarbonates and/or aromatic polyester carbonates are preferably those of formula (I)

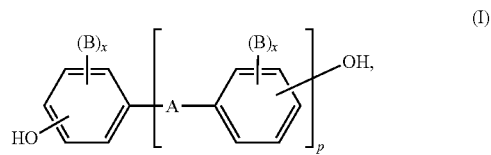

(I)

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO_2—, $C_6$ to $C_{12}$-arylene, onto which further aromatic rings optionally comprising heteroatoms may be condensed, or a moiety of formula (II) or (III)

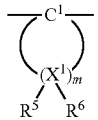

(II)

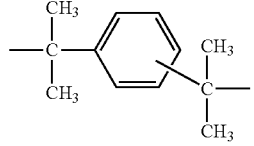

(III)

B is in each case $C_1$ to $C_{12}$-alkyl, preferably methyl, halogen, preferably chlorine and/or bromine, x is independently at each occurrence 0, 1 or 2, p is 1 or 0, and $R^5$ and $R^6$ can be chosen individually for each $X^1$ and are each independently hydrogen or $C_1$ to $C_6$-alkyl, preferably hydrogen, methyl or ethyl, $X_1$ represents carbon and m represents an integer from 4 to 7, preferably 4 or 5, with the proviso that on at least one atom $X_1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulphoxides, bis(hydroxyphenyl) ketones, bis(hydroxyphenyl) sulphones and α, α-bis (hydroxyphenyl) Diisopropylbenzenes, and also ring-brominated and/or ring-chlorinated derivatives of these.

Particularly preferred diphenols are 4,4'-dihydroxybiphenyl, bisphenol-A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxybiphenyl sulphide, 4,4'-dihydroxybiphenyl sulphone, and also the di- and tetrabrominated or chlorinated derivatives of these, for example 2,2-bis(3-chloro-4-hydroxyphenyl)propane, 2,2-bis(3,5-dichloro-4-hydroxyphenyl) propane or 2,2-bis(3,5-dibromo-4-hydroxyphenyl)propane, 2,2-bis(4-hydroxyphenyl) propane (bisphenol A) is especially preferred.

The diphenols may be used individually or in the form of any desired mixtures. The diphenols are known from the literature or obtainable by processes known from the literature.

Examples of chain terminators suitable for producing the thermoplastic aromatic polycarbonates include phenol, p-chlorophenol, p-tert-butylphenol or 2,4,6-tribromophenol, but also long-chain alkylphenols such as 4-[2-(2,4,4-trimethylpentyl)]phenol, 4-(1,3-tetramethylbutyl)phenol according to DE-A 2 842 005 or monoalkylphenol or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl) phenol and 4-(3,5-dimethylheptyl)phenol. The amount of chain terminators to be employed is generally between 0.5 mol % and 10 mol % based on the molar sum of the diphenols used in each case.

The thermoplastic aromatic polycarbonates may be branched in a known manner, and preferably through incorporation of 0.05 to 2.0 mol %, based on the sum of the diphenols used, of trifunctional or more than trifunctional compounds, for example those having three or more phenolic groups.

Both homopolycarbonates and copolycarbonates are suitable. Production of inventive copolycarbonates according to component A may also employ 1 to 25% by weight, preferably 2.5 to 25% by weight, based on the total amount of diphenols to be employed, of polydiorganosiloxanes having hydroxyaryloxy end groups. These are known (U.S. Pat. No. 3,419,634) and can be produced by processes known from the literature. The production of copolycarbonates comprising polydiorganosiloxane is described in DE-A 3 334 782.

Preferred polycarbonates are not only bisphenol A homopolycarbonates but also copolycarbonates of bisphenol A comprising up to 15 mol %, based on the molar sums of diphenols, of other diphenols mentioned as preferred or particularly preferred, in particular 2,2-bis(3,5-dibromo-4-hydroxyphenyl)propane.

Aromatic diacyl dihalides for the production of aromatic polyester-carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio of from 1:20 to 20:1.

Production of polyester carbonates additionally makes concomitant use of a carbonyl halide, preferably phosgene, as bifunctional acid derivative.

Chain terminators that can be used for the production of the aromatic polyester carbonates are not only the abovementioned monophenols but also the chlorocarbonic esters of these, and also the acyl chlorides of aromatic monocarboxylic acids, which can optionally have substitution by $C_1$ to $C_{22}$-alkyl groups or by halogen atoms; aliphatic $C_2$ to $C_{22}$-monoacyl chlorides can also be used as chain terminators here.

The quantity of chain terminators in each case is from 0.1 to 10 mol %, based on moles of diphenol in the case of the phenolic chain terminators and on moles of diacyl dichloride in the case of monoacyl chloride chain terminators.

The aromatic polyester carbonates may also incorporate aromatic hydroxycarboxylic acids.

The aromatic polyester carbonates may be either linear or else branched in a known manner; (in this connection see DE-A 2 940 024 and DE-A 3 007 934).

Examples of branching agents that can be used are acyl chlorides having a functionality of three or higher, e.g. trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in quantities of from 0.01 to 1.0 mol % (based on diacyl dichlorides used) or tri- or polyfunctional phenols, such as phloroglucinol, 4,6-dimethyl-2,4,6-tri(4-hydroxyphenyl) hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl) phenylmethane, 2,2-bis[4,4-bis(4-hydroxyphenyl)cyclohexyl]propane, 2,4-bis (4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl) propane, tetra(4-[4-hydroxyphenylisopropyl]phenoxy) methane, 1,4-bis[4,4'-dihydroxytriphenyl) methyl]benzene, in quantities of from 0.01 to 1.0 mol %, based on diphenols used. Phenolic branching agents can be used as initial charge with the diphenols, and acyl chloride branching agents can be introduced together with the acyl dichlorides.

The proportion of carbonate structural units in the thermoplastic aromatic polyestercarbonates may be varied as desired. The proportion of carbonate groups is preferably up to 100 mol %, in particular up to 80 mol %, particularly preferably up to 50 mol %, based on the sum of ester groups and carbonate groups. The ester fraction of the aromatic polyester carbonates, and also the carbonate fraction thereof, can take the form of blocks or can have random distribution in the polycondensate.

In a preferred embodiment, the aromatic polycarbonates or polyestercarbonates suitable as component A have a weight-average molar mass $M_w$ (determined by gel permeation chromatography (GPC) in methylene chloride with polycarbonate as standard) of 15 000 g/mol to 50 000 g/mol, preferably of 22 000 g/mol to 35 000 g/mol, in particular of 24 000 to 32 000 g/mol.

In preferred embodiments contemplated aromatic polyesters are polyalkylene terephthalates. In particularly preferred embodiments reaction products of aromatic dicarboxylic acids or reactive derivatives thereof, such as dimethyl esters or anhydrides, and aliphatic, cycloaliphatic or araliphatic diols and also mixtures of these reaction products are concerned here.

Particularly preferred aromatic polyalkylene terephthalates comprise at least 80% by weight, preferably at least 90% by weight, based on the dicarboxylic acid component of terephthalic acid radicals and at least 80% by weight, preferably at least 90% by weight, based on the diol component of ethylene glycol and/or butane-1,4-diol radicals.

The preferred aromatic polyalkylene terephthalates may comprise not only terephthalic acid radicals but also up to 20 mol %, preferably up to 10 mol %, of radicals of other aromatic or cycloaliphatic dicarboxylic acids having 8 to 14 carbon atoms or aliphatic dicarboxylic, acids having 4 to 12 carbon atoms, for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred aromatic polyalkylene terephthalates may comprise not only ethylene glycol/butane-1,4-diol radicals but also up to 20 mol %, preferably up to 10 mol %, of other aliphatic diets having 3 to 12 carbon atoms or cycloaliphatic diols having 6 to 21 carbon atoms, for example radicals of propane-1,3-dial, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(β-hydroxyethoxy)benzene, 2,2-bis (4-hydroxycyclohexyl)propane, 2,4-dihydroxy-1,1,3,3-tetramethylcyclobutane, 2,2-bis (4-β-hydroxyethoxyphenyl)propane and 2,2-bis(4-hydroxypropoxyphenyl)propane (DE-A 2 407 674, 2 407 776, 2 715 932).

The aromatic polyalkylene terephthalates may be branched through incorporation of relatively small amounts of tri- or tetrahydric alcohols or tri- or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particular preference is given to aromatic polyalkylene terephthalates which have been prepared solely from terephthalic acid and the reactive derivatives thereof (e.g. the dialkyl esters thereof) and ethylene glycol and/or butane-1,4-diol, and to mixtures of these polyalkylene terephthalates.

Preferred mixtures of aromatic polyalkylene terephthalates comprise 1 to 50% by weight, preferably 1 to 30% by weight, of polyethylene terephthalate and 50 to 99% by weight, preferably 70 to 99% by weight, of polybutylene terephthalate.

The preferably used aromatic polyalkylene terephthalates have a viscosity number of 0.4 to 1.5 dl/g, preferably 0.5 to 1.2 dl/g, measured in phenol/o-dichlorobenzene (1:1 parts by weight) in a concentration of 0.05 g/ml according to ISO 307 at 25° C. in an Ubbelohde viscometer.

The aromatic polyalkylene terephthalates can be prepared by known methods (see, for example, Kunststoff-Handbuch [Plastics Handbook], volume VIII, p, 695 et seq., Carl-Hanser-Verlag, Munich 1973).

Component B

Component B is selected from rubber-based graft polymers or mixtures of rubber-based graft polymers with rubber-free vinyl (co)polymers.

The graft polymers employed in component B in accordance with the invention comprise B.1 5 to 95% by weight, preferably 20 to 92% by weight, in particular 30 to 91% by weight, based on the graft polymer, of at least one vinyl monomer on B.2 95 to 5% by weight, preferably 80 to 8% by weight, in particular 70 to 9% by weight, based on the graft polymer of one or more rubber-elastic anti substrates having glass transition temperatures <−50° C., more preferably <−60° C., particularly preferably <−70° C.

Unless expressly stated otherwise in the present invention the glass transition temperature is determined for all components by dynamic scanning calorimetry (DSC) according to DIN EN 61006 (1994 version) at a heating rate of 10 K/min with determination of Tg as the midpoint temperature (tangent method).

The graft substrate B.2 generally has a median particle size (D50) of 0.05 to 10.00 μm, preferably of 0.1 to 5.0 μm, and particularly preferably of 0.2 to 1.5 μm.

The median particle size D50 is the diameter with 50% by weight of the particles above it and 50% by weight below it. Unless expressly stated otherwise in the present invention it is determined for all components by means of ultracentrifuge measurement (W. Scholtan, H. Lange, Kolloid, Z. and Z. Polymere [Polymers] 250 (1972), 782-1796).

Monomers B.1 are preferably mixtures of

B.1.1 65 to 85% by weight, particularly preferably 70 to 80% by weight, more preferably 74 to 78% by weight, in each case based on the sum of B.1.1 and B.1.2, of vinylaromatics and/or ring-substituted vinylaromatics (such as styrene, α-methylstyrene, p-methylstyrene, p-chlorostyrene) and/or (C1-C8)-alkyl (meth)acrylates, such as methyl methacrylate, ethyl methacrylate, and B.1.2 15 to 35% by weight, particularly preferably 20 to 30% by weight, more preferably 22 to 26% by weight, in each case based on the sum of B.1.1 and B.1.2, of vinyl cyanides (unsaturated nitriles such as acrylonitrile and methacrylonitrile) and/or (C1-C8)-alkyl (meth)acrylates, such as methyl methacrylate, n-butyl acrylate, t-butyl acrylate, and/or derivates (such as anhydrides and imides) of unsaturated carboxylic acids, for example maleic anhydride.

Preferred monomers B.1.1 are selected from at least one of the monomers styrene, α-methylstyrene and methyl methacrylate; preferred monomers B.1.2 are selected from at least one of the monomers acrylonitrile, maleic anhydride and methyl methacrylate. Particularly preferred monomers are B.1.1 styrene and B.1.2 acrylonitrile. Alternatively preferred monomers are B.1.1 methyl methacrylate and B.1.2 methyl methacrylate.

Suitable graft substrates B.2 of the graft polymers include for example diene rubbers, EP(D)M rubbers, i.e. those based on ethylene/propylene and optionally diene, acrylate, polyurethane, silicone, chloroprene, ethylene/vinyl acetate and also acrylate-silicone composite rubbers.

Preferred graft substrates B.1.2 are diene rubbers, preferably comprising butadiene or copolymers of dienes, preferably comprising butadiene, and further copolymerizable vinyl monomers (e.g. according to B.1.1 and B.1.2) or mixtures of one or more of the abovementioned components.

A particularly preferred graft substrate B.2 is pure polybutadiene rubber. In a further preferred embodiment B.2 is styrene-butadiene rubber, particularly preferably styrene-butadiene block copolymer rubber.

The gel fraction of the graft substrate B.2 is at least 30% by weight, preferably at least 40% by weight, in particular at least 60% by weight, in each case based on B.2 and measured as insoluble fraction in toluene.

The gel content of the graft substrate B.2/of the graft polymers in component B is determined at 25° C. in a suitable solvent as content insoluble in these solvents (M. Hoffmann, H, Krömer, R. Kuhn, Polymeranalytik I und II, Georg Thieme-Verlag, Stuttgart 1977).

Suitable polymers according to component B are for example ABS or MBS polymers as described for example in DE-OS 2 035 390 (=U.S. Pat. No. 3,644,574) or in DE-OS 2 248 242 (=GB-PS 1 409 275), or in Ullmanns, Enzyklopädie der Technischen Chemie, Vol. 19 (1980), p. 280 et seq.

The graft copolymers in component B are produced by free-radical polymerization, for example by emulsion, suspension, solution or bulk polymerization. Mixtures of graft polymers produced in different processes may also be used as component B.

When the graft polymers B are produced in emulsion polymerization then they comprise B.1 5 to 75% by weight, preferably 20 to 60% by weight, particularly preferably 25 to 50% by weight, based on the graft polymer, of at least one vinyl monomer on B.2 95 to 25% by weight, preferably 80 to 40% by weight, particularly preferably 75 to 50% by weight, based on the graft polymer of one or more rubber-elastic graft substrates having glass transition temperatures <−50° C., more preferably <−60° C., particularly preferably <−70° C.

The graft substrate B.2 of graft polymers B produced in emulsion polymerization have a median particle size (D50) of 0.05 to 2.00 μm, preferably of 0.1 to 1.0 μm, more preferably of 0.2 to 0.5 μm.

Graft polymers B produced in emulsion polymerization have a gel content, measured in acetone as solvent, of preferably at least 30% by weight, particularly preferably of at least 60% by weight, more preferably of at least 80% by weight.

When the graft polymers are produced in suspension, solution or bulk polymerization then they comprise B.1 80 to 95% by weight, preferably 84 to 92% by weight, particularly preferably 87 to 91% by weight, based on the graft polymer, of at least one vinyl monomer on B.2 20 to 5% by weight, preferably 16 to 8% by weight, particularly preferably 13 to 9% by weight, based on the graft polymer of one or more rubber-elastic graft substrates having glass transition temperatures <−50° C., more preferably <−60° C., particularly preferably <−70° C.

The graft substrate B.2 of graft polymers B produced in suspension, solution or bulk polymerization have a median particle size (D50) of 0.3 to 10.00 μm, preferably of 0.4 to 5.0 μm, more preferably of 0.5 to 1.5 μm.

Graft polymers B produced in suspension, solution or bulk polymerization have a gel content, measured in acetone as solvent, of preferably 10 to 50% by weight, particularly preferably of 15 to 40% by weight, more preferably of 18 to 30% by weight.

Particularly suitable graft polymers produced in the emulsion polymerization process are for example ABS polymers produced in the emulsion polymerization process by redox initiation with an initiator system composed of organic hydroperoxide and ascorbic acid according to U.S. Pat. No. 4,937,285.

Further particularly suitable graft polymers produced in the emulsion polymerization process are MBS modifiers having a core-shell structure.

Component B comprises five, i.e. not chemically bonded to the rubber substrate and not included in the rubber particles, vinyl (co)polymer composed of the monomers according to B.1. This may be formed in component B in the polymerization of the graft polymers owing to the method of production or else polymerized and admixed with component B separately. It is likewise possible for a portion of the free vinyl (co)polymer in component B to originate from the graft polymer itself owing to the method of production and for another portion to be polymerized and admixed with component B separately. The proportion of free vinyl (co) polymer (independent of origin), measured as the acetone-soluble proportion, in component B is, based on component B, preferably at least 5% by weight, particularly preferably at least 30% by weight, more preferably at least 50% by weight.

This free vinyl (co)polymer has in the rubber-modified vinyl copolymers according to component B a weight-average molecular weight $M_w$ of 30 to 250 kg/mol, preferably of 70 to 200 kg/mol, in particular of 90 to 180 kg/mol.

In the context of the present invention the weight average molecular weight Mw of the free vinyl (co)polymer in component B is measured by gel permeation chromatography (GPC) in tetrahydrofuran against a polystyrene standard.

Component C

Component C is a polyether-based polymer or copolymer selected from the group consisting of polyether block polymers and polyether-based polyurethanes.

Component C is preferably a polyether block polymer.

Examples of polyether block polymers include block copolymers comprising polyether blocks and polymer blocks selected from at least one representative of the group consisting of polyamide, polyolefins, polyesters and polyacrylates. Preference is given to polyether block amides (PEBA), polyester block amides and polyetherester block amides and also mixtures of these polymers. Polyether block amides (PEBA) are particularly preferred.

These block copolymers preferably comprise 10 to 90% by weight, particularly preferably 20 to 80% by weight, more preferably 30 to 70% by weight, based on the block copolymer of polyether blocks.

The polyether block fraction in the block copolymer preferably consists to an extent of at least 50% by weight, particularly preferably to an extent of at least 80% by weight, more preferably to an extent of at least 90% by weight, of ethylene glycol units. In the most preferred embodiment the polyether blocks are polyethylene glycol.

The polyether block amides employed in component C are preferably polyether block amides (PEBA) consisting of thermoplastic hard segments of polyamide sequences and elastomeric soft segments of polyether sequences which are linked to one another either via ester or amide groups. Such polyether block amides are obtainable by linking terminally functionalized, preferably terminally carboxylate-functionalized oligoamides with difunctional oligoethers, preferably with oligoethers having hydroxyl or amino end groups. The polyamide employed in the polyether block amides (PEBA) is preferably polyamide 12.

The polyether block amides (PEBA) particularly preferably consist of polyethylene glycol and polyamide 12 blocks.

In a preferred embodiment component C comprises as the polyether-based polymer a polyether block polymer consisting to an extent of 10 to 90% by weight, particularly preferably 20 to 80% by weight, more preferably 30 to 70% by weight, based on the block copolymer of polyethylene glycol blocks and to an extent of 10 to 90% by weight, particularly preferably 20 to 80% by weight, more preferably 30 to 70% by weight, based on the block copolymer of polyamide 12.

The polyether block polymers employed in component C are known from the literature and disclosed for example in U.S. Pat. No. 4,871,804 (Daicel), EP 730005 (General Electric), EP 613919 (Sanyo Kasai), EP 1046675 (Arkema), EP 1155065 (Arkema) EP 1262527 (Arkema) and JP 09137053 (Asahi).

Component C has a specific electrical surface resistance measured according to IEC 60093 (1993 version) of preferably $\leq 10^{13}\Omega$, particularly preferably of $\leq 10^{12}\Omega$, more preferably of $\leq 10^{11}\Omega$.

Pebax™ MV1074 SP01 (Arkema, France) for example is suitable as component C.

Component D

One or more pigments based on titanium dioxide are employed as component D.

Naturally occurring, synthetically produced or modified naturally occurring pigments or mixtures thereof are concerned. The pigments preferably have a crystal structure modification selected from rutile, anatase or brookite. The preferred modification is rutile.

Inventive pigments based on titanium dioxide have a density (according to DIN EN ISO 787-10) of 3.6 to 4.4 g/cm$^3$, preferably of 3.8 to 4.3 g/cm$^3$, particularly preferably of 4.0 to 4.2 g/cm$^3$.

The pigments may be derived in a known manner by the sulphate process or the chloride process from natural raw materials such as ilmenite, rutil ore or TiO$_2$ slag.

The pigments may have an inorganic and/or organic surface modification, preferably based on aluminium and/or polysiloxane compounds. The proportion of titanium dioxide (according to DIN EN ISO 591) is preferably >90% by weight, particularly preferably >92% by weight, more preferably >95% by weight.

In preferred embodiments the pigments have an oil absorption (according to ISO787-5) of 5 to 50 g/100 g of pigment, more preferably of 10 to 25 g/100 g of pigment and particularly preferably of 12 to 18 g/100 g of pigment.

Component E

The composition may comprise as component E one or more further additives, preferably selected from the group consisting of flame retardants (e.g. organic phosphorus or halogen compounds, in particular bisphenol-A-based oligophosphate), anti-drip agents (for example compounds of the substance classes of fluorinated polyolefins, silicones and aramid fibers), flame retardant synergists (for example nanoscale metal oxides), smoke inhibitors (for example zinc borate), lubricants and demoulding agents (for example pentaerythritol tetrastearate), nucleating agents, further antistats and conductivity additives distinct from component C, compounds which increase the conductivity of component C (such as salts, acids or ionomers), stabilizers (e.g. hydrolysis, heat-ageing and transesterification stabilizers, UV stabilizers and acid/base quenchers) flow promoters, compatibilizers (e.g. polymethyl methacrylate), impact modifiers without a core-shell structure, antibacterial additives (for example silver or silver salts), scratchproofing additives (for example silicone oils), IR absorbents, optical brighteners, fluorescing additives, further polymeric constituents distinct from components A to C (for example functional blend partners), dyes and pigments distinct from component D and also fillers and reinforcers (for example, carbon fibres, talc, mica, kaolin, CaCO$_3$).

The employed salt which improves the conductivity of component C is preferably a boron-containing salt.

The boron-containing salt is preferably at least one alkali metal salt of a boron-centred anionic complex comprising bidentate ligands selected from the group consisting of C2-C8-aliphatic or aromatic components having at least two reactive groups selected from —COOH and —OH.

In particularly preferred embodiments the boron-containing salt is an alkali metal salt of the bis(oxalato)borate anion, particularly preferably potassium bis(oxalato)borate or sodium bis(oxalato)borate.

The salt is preferably employed in a proportion of 0.2 to 10% by weight, more preferably of 0.4 to 4.0% by weight, most preferably of 1.0 to 3.0% by weight, in each case based on component C.

In a further embodiment component C is premixed with the salt and/or one or more further, preferably polymeric, components, optionally processed into a precompound and employed as such a mixture or precompound for producing the moulding materials according to the invention.

The invention therefore further provides a process for producing thermoplastic moulding materials where in a first step a polyether block polymer and polyether-based polyurethane is premixed with a salt, preferably a boron salt, particularly preferably potassium bis(oxalato)borate or sodium bis(oxalato)borate, and/or one or more further, preferably polymeric, components and optionally processed into a precompound. In a second step of the process according to the invention the mixture or the precompound from step 1 is then mixed with components A, B, D and optionally E and subsequently subjected to melt compounding and melt extrusion.

In preferred embodiments the composition is free from flame retardants, anti-drip agents, flame retardant synergists and smoke inhibitors.

In likewise preferred embodiments the composition is free from fillers and reinforcers.

In particularly preferred embodiments the composition is free from flame retardants, anti-drip agents, flame retardant synergists, smoke inhibitors and fillers and reinforcers.

In preferred embodiments the composition comprises at least one polymer additive selected from the group consisting of lubricants and demoulding agents, stabilizers, flow promoters, compatibilizers and dyes and pigments distinct from component D.

Production of the Moulding Materials and Moulded Articles

The inventive thermoplastic moulding materials may be produced, for example, by mixing the respective constituents and melt compounding and melt extruding the resulting mixture at temperatures of preferably 200° C. to 320° C., particularly preferably at 240° C. to 300° C., in customary apparatuses such as for example internal kneaders, extruders and twin-shaft screw systems in a known manner.

The mixing of the individual constituents may be carried out in a known manner, either successively or simultaneously, either at about 20° C. (room temperature) or at a higher temperature.

The invention also provides a process for producing the compositions according to the invention.

The moulding materials according to the invention may be used for producing moulded articles of any kind. These may be produced by injection moulding, extrusion or blow-moulding processes for example. Another form of processing is the production of moulded articles by deep drawing from previously produced sheets or films.

Examples of such moulded articles are films, profiles, housing parts of any type, e.g. for domestic equipment such as juicers, coffee machines, mixers; for office machines such as monitors, flat screens, notebooks, printers, copiers; sheets, pipes, electrical installation ducts, windows, doors and other profiles for the construction sector (internal fitout and external applications), and also electrical and electronic components such as switches, plugs and sockets, and components for commercial vehicles, in particular for the automotive sector. The compositions according to the invention are also suitable for the production of the following moulded articles or mouldings: components for internal fitout of rail vehicles, of ships, of aircraft, of buses and other motor vehicles, bodywork components for motor vehicles, housings of electrical equipment comprising microtransformers, housings for equipment for the processing and transmission of information, housings and cladding for medical equipment, massage equipment and housings therefor, toy vehicles for children, sheetlike wall elements, housings for safety equipment, thermally insulated transport containers, mouldings for sanitation and bath equipment, protective grilles for ventilation openings and housings for garden equipment.

The moulding materials according to the invention are particularly suitable for the production of permanently antistatic mouldings having a low propensity for dust attraction, particularly preferably for uncoated decorative components in automotive interiors.

The present invention also relates to the use of the envisaged and claimed compositions for producing moulded articles and to the moulded articles themselves which comprise one of these compositions.

EXAMPLES

Component A:
Linear polycarbonate based on bisphenol A having a weight-average molar mass MW of 30 000 g/mol (determined by GPC in methylene chloride against a BPA-PC standard).

Component B:
Acrylonitrile-butadiene-styrene (ABS) polymer produced in the bulk polymerization process which comprises a disperse phase of polybutadiene-containing rubber particles with inclusions of styrene-acrylonitrile copolymer and a styrene-acrylonitrile-copolymer matrix and has an A:B:S ratio of 23:10:67% by weight and a gel content determined as the fraction insoluble in acetone of 20% by weight. The free, i.e. acetone-soluble, styrene-acrylonitrile copolymer in component B1 has a weight average molecular weight $M_w$ (measured by GPC in acetone as solvent with polystyrene standard) of 165 kg/mol. The median rubber particle size D50, measured by ultracentrifugation, is 0.85 μm. The melt volume flow rate (MVR) of component B1, measured according to ISO 1133 (2012 version) at 220° C. with a ram loading of 10 kg, is 6.7 ml/10 min.

Component C:
Polyetheramide block copolymer (PEBA) consisting to an extent of 50% by weight based on the PEBA of polyethylene glycol blocks and to an extent of 50% by weight based on the PEBA of polyamide 12 blocks. The specific electrical surface resistance is $3·10^9 \Omega$ measured according to IEC 60093 (1993 version).

Component D1:
Kronos™ 2233 (Kronos Titan GmbH, Leverkusen, Germany):
Titanium dioxide pigment having a rutile structure, produced in the chloride process, having a surface coating of aluminium and polysiloxane compounds. The titanium dioxide content determined according to DIN EN ISO 591 is ≤96% by weight, the density determined according to DIN EN ISO 787-10 is 4.2 g/cm3 and the oil absorption determined according to DIN EN ISO 787-5 is 14.5 g/100 g of pigment.

Component D2:
Iron oxide pigment: Bayferrox™ 180M (Lanxess AG, Cologne, Germany)

Component D3:
Carbon black: Black Pearls™ 800 (Cabot Corporation)

Component E1:
pentaerythritol tetrastearate

Component E2:
Irgafos™ 168 (BASF; Ludwigshafen, Germany):
tris(2,4-di-tert-butylphenyl)phosphite Component E3:
Irganox™ 1076 (BASF; Ludwigshafen, Germany):
2,6-di-tert-butyl-4-(octadecanoxycarbonylethyl)phenol Production and Testing of the Moulding Materials of the Invention The components were mixed on a Werner & Pfleiderer ZSK-25 twin-screw extruder at a melt temperature of 260° C. and with application of subatmospheric pressure of 50 mbar (absolute). With the exception of the test specimens for the puncture test the moulded articles were produced at a melt temperature of 260° C. and a mould temperature of 80° C. on an Arburg 270E injection moulding machine. The test specimens for the puncture test were produced at a melt temperature of 300° C. with otherwise identical processing parameters.

IZOD notched impact strength was determined at −30° C. according to ISO 180-1A (1982 Version) on, respectively, ten test specimens measuring 80 mm×10 mm×4 mm. Individual notched impact strength values >30 kJ/m$^2$ were classified as tough fracture behaviour.

The Vicat B/120 as a measure of heat distortion resistance was determined according to the ISO 306 (2013 version) on test specimens having dimensions of 80 mm×10 mm×4 mm with a ram loading of 50 N and a heating rate of 120° C./h.

Behaviour in the multiaxial puncture test was used as a measure of low-temperature ductility in the practice-relevant impact/crash test. The puncture test was performed at −30° C. according to ISO 6603-2 (2000 version) on test specimens having dimensions of 60 mm×60 mm×2 mm. These were fabricated at an elevated melt temperature of 300° C. in order to simulate particularly critical processing conditions. The test specimens were assessed having regard to the failure types YD, YS, YU and NY listed in ISO 6603-2. The fracture modes of a total of ten test specimens were evaluated to determine whether a tough (non-shattering) or brittle (shattering) fracture mode occurs. According to ISO 6603-2 the failure types YD, YS and YU were defined as a tough (non-shattering) fracture mode and the failure type NY as a brittle (shattering) fracture mode.

In addition, to achieve a more refined differentiation of material ductility, the proportion of the test specimens obtaining grades of YD and YS, i.e the number of test specimens where no crack formation or at least stable crack formation occurred, was assessed.

Specific surface resistance was determined according to IEC 60093 (1993 version) on round sheets having a diameter of 60 mm and a thickness of 2 mm.

TABLE 1

Compositions and properties thereof

| | C1 | C2 | C3 | 4 | 5 | 6 | 7 | 8 | C9 | C10 |
|---|---|---|---|---|---|---|---|---|---|---|
| Components [parts by weight] | | | | | | | | | | |
| A | 70 | 70 | 70 | 70 | 70 | 70 | 70 | 70 | 70 | 70 |
| B | 23 | 23 | 23 | 23 | 23 | 23 | 23 | 23 | 23 | 23 |
| C | 7 | 7 | 7 | 7 | 7 | 7 | 7 | 7 | 7 | 7 |
| D1 | | 0.10 | 0.50 | 2.00 | 4.00 | 4.77 | 6.00 | 10.00 | | |
| D2 | | | | | | | | | 4.00 | |
| D3 | | | | | | | | | | 4.00 |
| E1 | 0.75 | 0.75 | 0.75 | 0.75 | 0.75 | 0.75 | 0.75 | 0.75 | 0.75 | 0.75 |
| E2 | 0.08 | 0.08 | 0.08 | 0.08 | 0.08 | 0.08 | 0.08 | 0.08 | 0.08 | 0.08 |
| E3 | 0.22 | 0.22 | 0.22 | 0.22 | 0.22 | 0.22 | 0.22 | 0.22 | 0.22 | 0.22 |
| Properties | | | | | | | | | | |
| Notched impact strength (−30° C.) [kJ/m$^2$] | 4 | 21 | 50 | 68 | 76 | 55 | 68 | 67 | 52 | 10 |
| Tough-brittle transition temperature in IZOD notched impact test [° C.] | >23° C. | | | | | −35 | | | | |
| % ductile fracture behaviour in puncture test (−30° C.) | 0 | 0 | 0 | 100 | 100 | 100 | 100 | 100 | 10 | 0 |
| % no crack formation or stable crack formation in puncture test (−30° C.) | 0 | 0 | 0 | 100 | 80 | 70 | 40 | 0 | 0 | 0 |
| Vicat B/120 [° C.] | 111 | 120 | 127 | 128 | 128 | 128 | 127 | 128 | 128 | 130 |
| Surface resistance [Ω] | $3 \cdot 10^{15}$ | $2 \cdot 10^{14}$ | $1 \cdot 10^{14}$ | $9 \cdot 10^{12}$ | $8 \cdot 10^{12}$ | $7 \cdot 10^{12}$ | $8 \cdot 10^{12}$ | $8 \cdot 10^{12}$ | $4 \cdot 10^{13}$ | $1 \cdot 10^{14}$ |

The data in table 1 show that the inventive examples 2-8 comprising a titanium dioxide proportion as claimed exhibit better low-temperature toughness, electrical dissipative conductivity (lower specific electric surface resistance) and also higher heat distortion resistance than the corresponding compositions without titanium dioxide or with a titanium dioxide proportion outside the claimed range. This is surprising because it is the general experience of those skilled in the art that the material toughness of PC+ABS blends tends to suffer rather than benefit from the addition of inorganic pigments in particular at low temperatures under the action of the pigments as defects and on account of the pigment-induced molecular weight reduction in the polycarbonate under the thermal conditions during compounding and injection moulding. The examples also show that the desired improvements are not achieved with other pigments such as carbon black or iron oxide.

The invention claimed is:

1. A composition comprising
   A) 60 to 80% by weight of at least one aromatic polycarbonate, based on bisphenol A, and having a weight average molar mass Mw of from 24 000 to 32 000 g/mol,
   B) 10 to 30% by weight of rubber-based graft polymer or a mixture of rubber-based graft polymer and rubber-free vinyl (co)polymer, wherein the rubber-based graft polymer comprises styrene/acrylonitrile copolymer on rubber-elastic substrates selected from polybutadiene rubbers and styrene-butadiene rubbers,
   C) 5 to 15% by weight of at least one polyether block amide,
   D) 2 to 10% by weight of at least one pigment based on titanium dioxide, wherein the at least one pigment based on titanium dioxide is in rutile modification having a surface modification based on aluminium and/or polysiloxane and an oil absorption of 10 to 25 g/100 g of the at least one pigment based on titanium dioxide, and
   E) 0 to 20% by weight of one or more further additives.

2. The composition according to claim 1, wherein component A is aromatic polycarbonate.

3. The composition according to claim 1, wherein components C and D are employed in a weight ratio C/D of 1.1 to 4.

4. The composition according to claim 1, wherein component C is a block copolymer comprising polyethylene glycol and polyamide blocks.

5. The composition according to claim 1, comprising as component E at least one additive selected from the group consisting of lubricants and demoulding agents, stabilizers, flow promoters, compatibilizers and dyes and pigments distinct from component D.

6. The composition according to claim 1 consisting of components A) to E).

7. A method comprising providing the composition according to claim 1 for the production of moulded articles.

8. A moulded article obtained from the composition according to claim 1.

9. A method comprising utilizing pigments based on titanium dioxide for improving toughness and electrical surface conductivity of compositions endowed with polyether-based polymers and comprising at least one aromatic polycarbonate, wherein the compositions comprise 60 to 80% by weight of at least one aromatic polycarbonate, based on bisphenol A, and having a weight average molar Mw of from 24 000 to 32 000 g/mol,
   10-30% by weight of rubber-based graft polymer or a mixture of rubber-based graft polymer and rubber-free vinyl (co)polymer, wherein the rubber-based graft polymer comprises styrene-acrylonitrile copolymer on rubber-elastic substrates selected from polybutadiene rubbers and styrene-butadiene rubbers,
   5 to 15% by weight of at least one polyether block amide,
   2 to 10% by weight of at least one pigment based on titanium dioxide, wherein the at least one pigment based on titanium dioxide is in rutile modification having a surface modification based on aluminum and/or polysiloxane and an oil absorption of 10 to 25 g/100 g of the at least one pigment based on titanium dioxide, and 0 to 20% by weight of one or more further additives.

10. The method according to claim 9, wherein the at least one polyether block amide is a block copolymer comprising polyethylene glycol and polyamide blocks.

11. The method according to claim 9, wherein the at least one pigment based on titanium dioxide is employed in a proportion of 3 to 7% by weight based on the compositions.

* * * * *